Aug. 29, 1950  W. JOHNDREW  2,520,316
MEANS FOR CONTROLLING THE MOVEMENT OF A TOOL
Filed Jan. 7, 1944  4 Sheets-Sheet 2

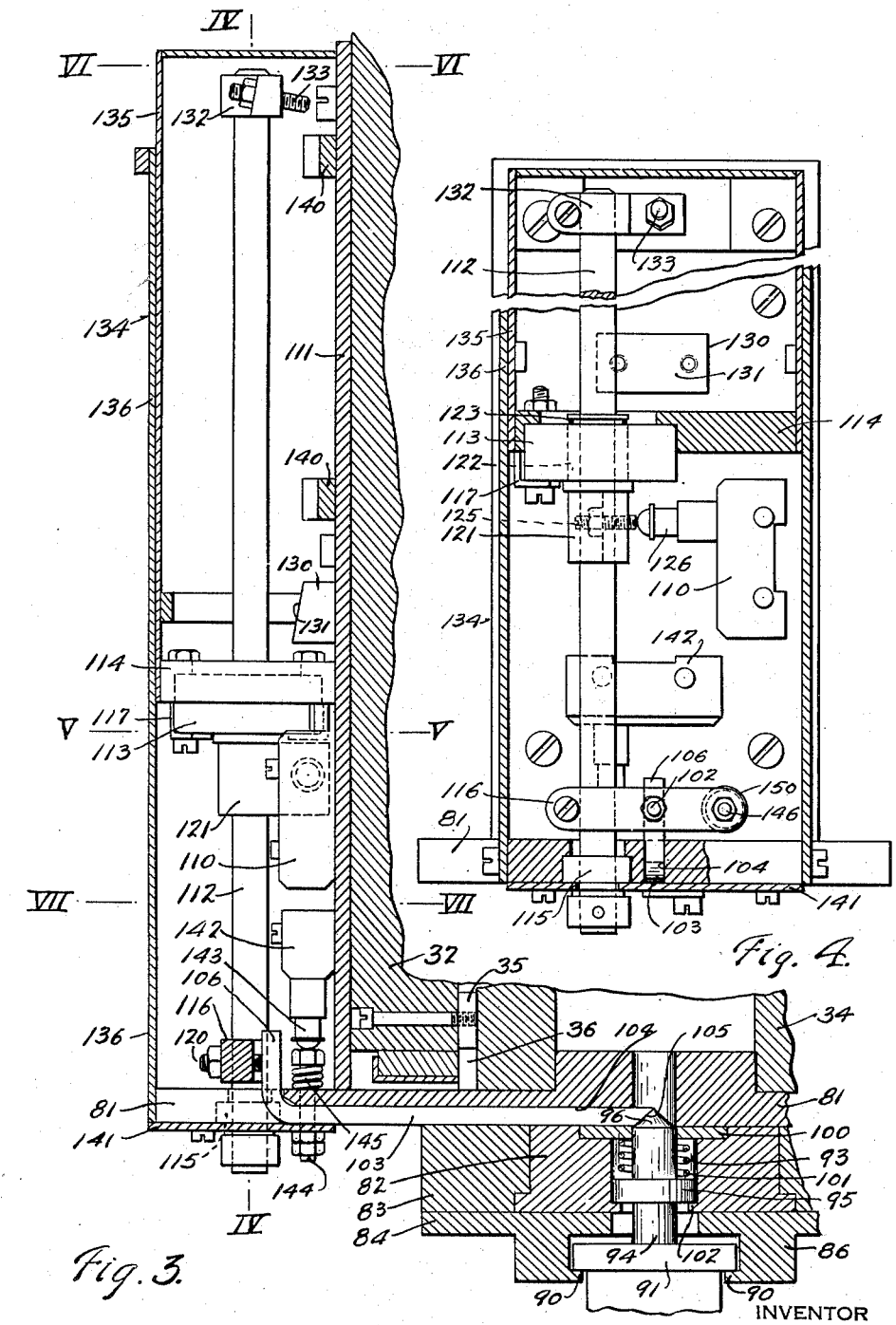

INVENTOR
WILBUR JOHNDREW
BY
Beau, Brooks, Buckley & Beau.
ATTORNEYS

Aug. 29, 1950 W. JOHNDREW 2,520,316
MEANS FOR CONTROLLING THE MOVEMENT OF A TOOL
Filed Jan. 7, 1944 4 Sheets-Sheet 3
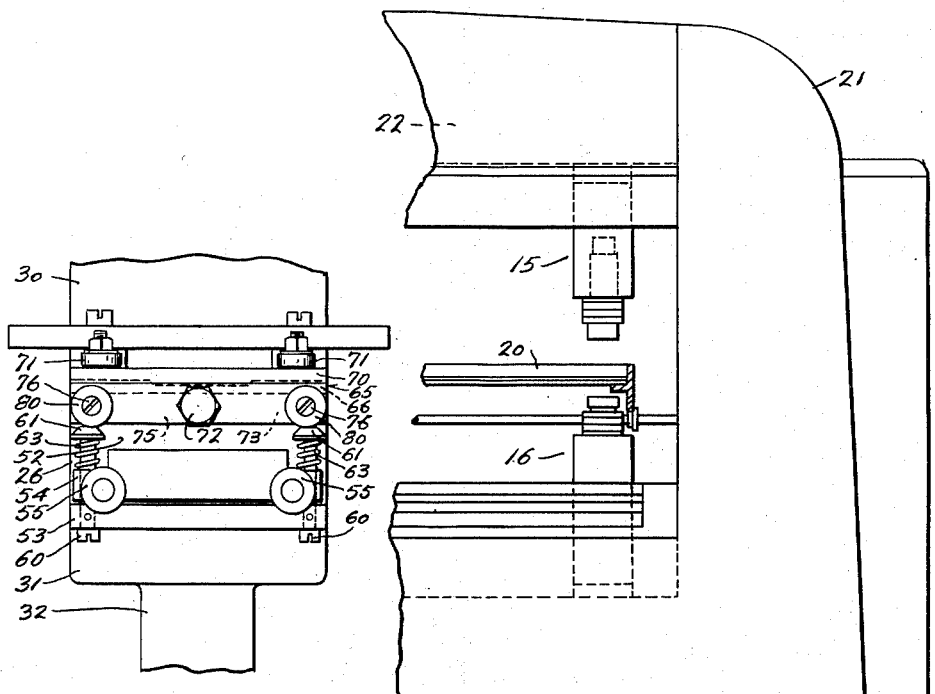
Fig. 9.
Fig. 1.
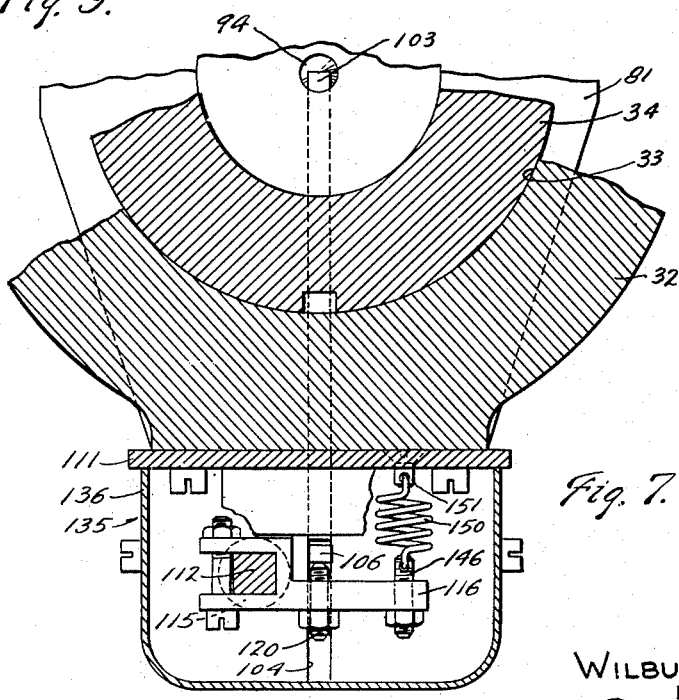
Fig. 7.
INVENTOR
WILBUR JOHNDREW
BY
Bean, Brooks, Buckley & Bean,
ATTORNEYS Aug. 29, 1950     W. JOHNDREW     2,520,316
MEANS FOR CONTROLLING THE MOVEMENT OF A TOOL
Filed Jan. 7, 1944     4 Sheets-Sheet 4

INVENTOR
WILBUR JOHNDREW
BY
Beau, Brooks, Buckley & Beau.
ATTORNEYS

Patented Aug. 29, 1950

2,520,316

UNITED STATES PATENT OFFICE 2,520,316

MEANS FOR CONTROLLING THE MOVEMENT OF A TOOL

Wilbur Johndrew, Buffalo, N. Y.

Application January 7, 1944, Serial No. 517,301

7 Claims. (Cl. 192—129)

My invention relates in general to means for controlling the movements of a tool, and particularly to means for stopping the downward movement of the tool when it has reached a predetermined point in its travel, as for instance by contact with the surface of a workpiece. While my invention may be adapted to the control of the movements of any tool doing useful work, it is particularly adapted to the control of the riveting tool of a riveting machine, such as the anvil unit or bucking unit.

The principal object of my invention has been to provide means, controlled by contact of the working surface of a tool with the workpiece for stopping further movement of the tool.

Another object has been to loosely mount the tool so that the resulting relative vertical movement between the tool and its supporting means may be used to interrupt further movement of the tool.

Another object has been to provide an oscillating shaft actuated by a laterally movable rod at a predetermined point in the travel of the tool to operate a control switch.

Moreover, my invention contemplates the mounting of the tool for lateral movement, and has for a further object to provide means to guide the tool assembly in its lateral movement by surfaces carried by one only of the guideways, thereby insuring accuracy without having to accurately align two separated guideways.

Furthermore, my invention provides anti-friction support for the tool assembly during its lateral adjustment while maintaining the load and thrust surfaces in registration, and but slightly separated.

Moreover, it has been an object to provide spring pressed actuating means carried by the tool holder and controlled by the upward movement of the floating tool to actuate the oscillating shaft.

The above objects and advantages have been accomplished by the device shown in the accompanying drawings of which:

Fig. 1 is a fragmentary front elevation of a riveting machine.

Fig. 3 is an enlarged fragmentary view of the switch control means.

Fig. 4 is a fragmentary sectional front view thereof taken on line IV—IV of Fig. 3.

Fig. 7 is a transverse sectional view taken on line VII—VII of Fig. 3.

Fig. 9 is a fragmentary front elevation of the guide slipper and anti-friction support for the bucking tool.

Figure 10:
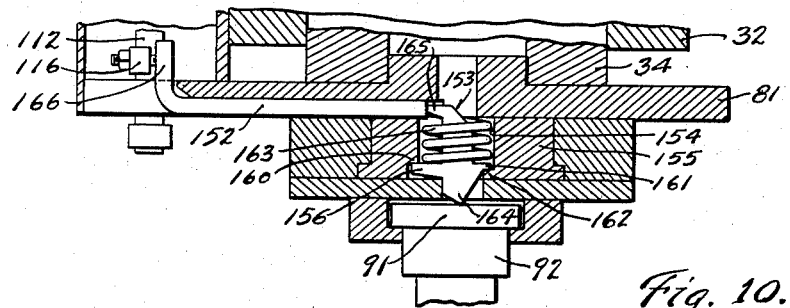
Fig. 10 is a modified form of actuating means for the oscillating shaft.
Figure 5:
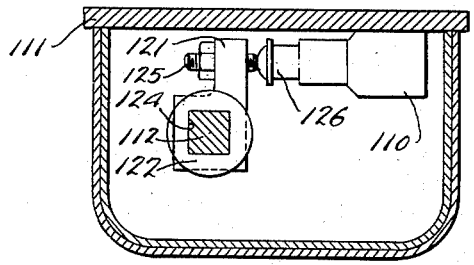
Fig. 5 is a transverse sectional plan view of the control means taken on line V—V of Fig. 3.
Figure 6:
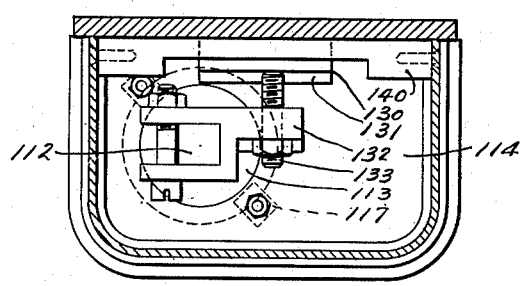
Fig. 6 is a similar view taken on line VI—VI of Fig. 3.

As hereinbefore stated, my invention is particularly adapted to the control of the anvil or bucking tool of a riveting machine, and, therefore, in Fig. 1 I have shown a fragmentary portion of such machine. The machine comprises a bucking unit 15 and a riveting unit 16 coaxially arranged and provided with suitable mechanism for movement toward each other when acting upon the workpiece 20. The mechanism for operating the bucking unit will be hereinafter described but the mechanism for operating the riveting anvil is not shown or described since it forms no part of the present invention. The machine has a housing 21 which encloses the guideways 22 and 23 for the bucking unit, to which my invention is particularly applicable.

These guideways are spaced apart and are preferably arranged parallel to each other. The guideway 23 is preferably provided with a bearing groove 24 and a coacting bearing surface 25, to be hereinafter described.

Figure 2:
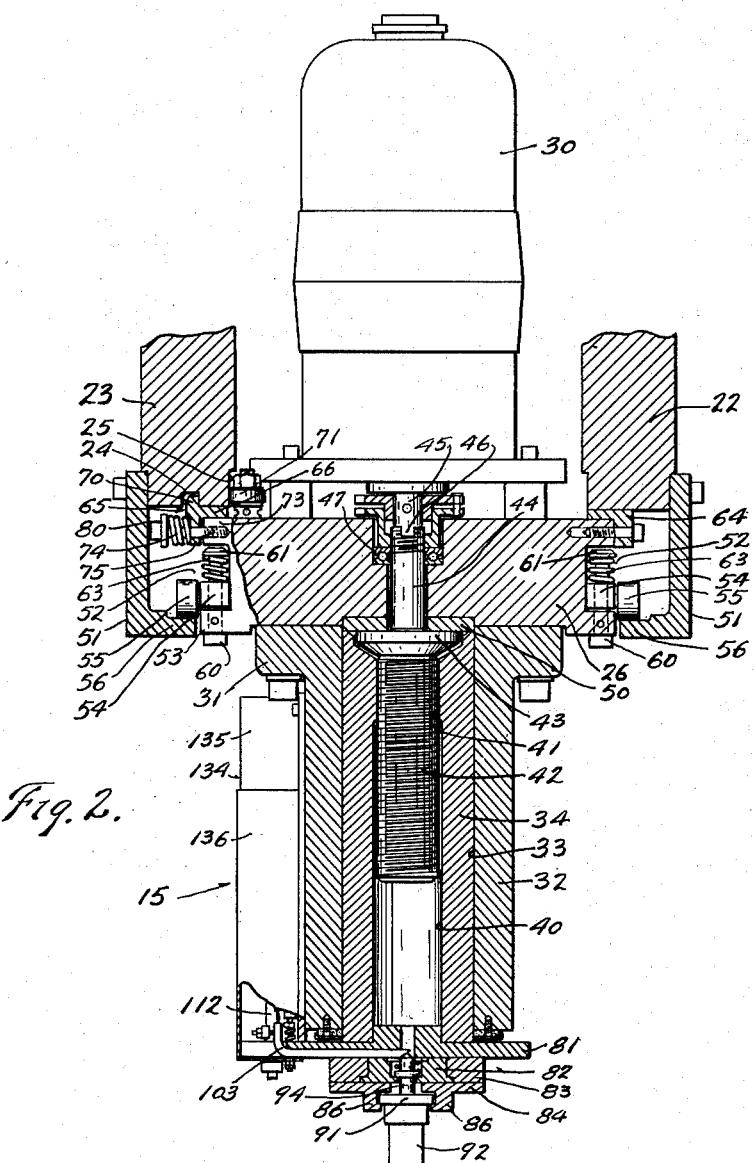
Fig. 2 is an enlarged sectional elevation of the bucking unit of the riveting machine.
Figure 8:
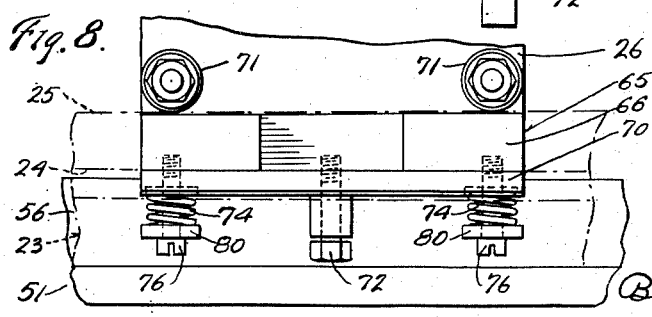
Fig. 8 is an enlarged fragmentary plan view showing the guide slipper for the unit and its association with the cooperating parts.

The bucking unit of the riveting machine comprises a supporting base 26 to the upper surface of which is secured the electric motor 30 for operating the screw 42 of the bucking tool, to be hereinafter described. To the bottom surface of the base is secured the attaching flange 31 of the guide sleeve 32. The guide sleeve is provided with a cylindrical bore 33 within which is slidably mounted a ram 34. The ram is prevented from turning within the sleeve by means of a key 35 which engages a keyway 36 formed in the ram. The ram is provided with a cylindrical bore 40 at the upper end of which screw threads 41 are formed for the reception of a ram screw 42. This ram screw is provided at its upper end with a thrust collar 43, and with a shaft portion 44 extending upwardly from the thrust portion. The shaft portion is connected to the shaft 45 of the motor by means of a tongue and groove connection 46 shown in Fig. 2. The upper end of the shaft is preferably supported in an anti-friction bearing 47, and the thrust collar 48 engages a thrust plate 50 disposed at the lower surface of the supporting base.

A supporting angle 51 is secured to the outside surface of each of the guideways 22 and 23 and serves to support the base 26 of the unit. Each of the side edges of the supporting base is formed with a recess 52 thereby providing lower ledges or flanges 53 and upper ledges 73. A supporting block 54 is mounted in each of the recesses 52 and is provided with two anti-friction rollers 55 which are engageable with the upper surface of the inwardly projecting leg 56 of the supporting angle. Each of the supporting blocks is mounted for vertical movement upon the guide screws 60 which extend up through the lower ledge 53 of the supporting base to which they are suitably fastened. A spring cap 61 is secured to the upper end of each of these guide screws, and a helical spring 63 is disposed between each of the caps and the surface of the block for urging the block downwardly to force the rollers 55 in contact with the supporting angles.

The bottom surfaces of the guideways 22 and 23 are, of course, machined to form bearing surfaces for the supporting base 26 when load is applied to the unit. A floating slipper 64 is carried at one of the lateral edges of the base for engagement with the bottom surface of the guideway 22 and a guide slipper 65 is mounted at the opposite edge of the supporting base having a leg 66 for contact with the bottom surface of the guideway 23. The guide slipper is also provided with an upstanding flange 70, arranged preferably at right angles to the flange 66 for engagement with the vertical bearing surface of the groove 24 which is opposite the bearing surface 25 of the guideway. Guide rollers 71 are provided for bearing contact with the surface 25, and these rollers are mounted upon the upper surface of the supporting base 26. By this construction it will be seen that the surface 25 and the bearing surfaces of the groove 24 may be machined and finished at the same time thereby insuring parallelism of these two unit guiding surfaces. By providing both bearings on one guideway, the necessity of having to align two separated guideways is avoided. The guide slipper 65 is mounted in floating manner upon a guide stud 72 which is screw threaded into the ledge 73 of the supporting base and which serves to guide the guide slipper should there be any lateral movement thereof. At each end of the guide slipper there is provided a compression spring 74, one end of which engages a downwardly extending flange 75 formed on the slipper 65 and having its other end bearing against a washer 89. By means of these compression springs which are held in place by bolts 76, the guide slipper is urged inwardly so as to cause the flange 70 to firmly bear on the surface of the groove and the rollers 71 to be drawn against the bearing surfaces.

From the foregoing it will be obvious that when the unit 15 is being moved laterally to bring the tool in registration, the entire unit will be supported in resilient manner by the anti-friction rollers 55. When, however, the unit has come to the end of its lateral movement and the tool is fed downwardly to bring it into action, the upward thrust produced upon the tool will serve to force the supporting base upwardly, thereby forcing the same against the bearing surfaces of the guideways 22 and 23. It is obvious that the rollers 55 are so adjusted that the co-acting surfaces between the slippers and the guideways are separated only a few thousandths of an inch, so that there is practically no lost motion when the weight of the unit is transferred.

A base plate 81 is secured to the lower end of the ram 34 and an index flange 82 is attached to the plate and serves adjustably to hold an index plate 83 in position. A plate retaining flange 84 is secured to the bottom surface of the index plate 83 and is provided with oppositely arranged parallel anvil ways 86. These ways are provided with retaining lips 90 for engagement with the head 91 of the anvil 92. The retaining lips are separated from the surface of the retaining flange a distance greater than the thickness of the anvil head so that the anvil is permitted to have free vertical movement when its working surface contacts with the workpiece.

Mounted within an opening 93 of the index flange is an actuating pin 94 having a flange 95. The lower end of the pin is designed to contact with the upper surface of the anvil head 91, and the upper end 96 of the pin is conical in form. A bearing plate 100 is carried by the index flange at the upper end of the opening 93 and serves to provide a bearing for the upper end of the pin as well as an abutment for the upper end of a helical spring 101. The lower end of this spring bears against the flange 95 of the pin serving to normally keep the pin pressed downwardly with its flange in engagement with a ledge 102 formed at the bottom of the opening 93 in the index flange.

A push rod 103, which is preferably square in cross section or of other polygonal shape is mounted in a lateral groove 104 formed in the base plate 81 and extending preferably from the center of the base plate outwardly in radial direction to a point near its outer edge. The inner end of this rod is provided with an inclined surface 105 for engagement with the conical end 96 of the pin 94, whereby vertical movement of the pin will cause lateral movement of the rod. The outer end of the rod has an upwardly bent portion 106 whereby the lateral movement of the rod is caused to actuate the control switch 119 by means which will now be described.

Arranged vertically along one surface of the guide sleeve is a mounting plate 111, which is suitably secured to the sleeve and to which the elements of the control means are secured. A control shaft 112 extends upwardly in spaced relation with the mounting plate and passes through an anti-friction bearing 113 carried by a bearing plate 114 which is held in place by clips 117. This shaft is preferably square in cross section and is not only supported by the bearing, but is axially movable therethrough. The control shaft is rotatably supported at its lower end by an anti-friction bearing 115, carried by the base plate 81, thereby preventing axial movement thereof. This control shaft is provided at its lower end with a rod operating lever 116 which is securely clamped to the shaft by suitable means and which carries an adjusting screw 120 having its end bearing against the upwardly extending end 106 of the push rod, whereby when the push rod is moved outwardly in radial direction, the lever will cause the shaft 112 to be oscillated. Since the shaft 112 is fixed axially to the base plate 81, which in turn is carried by the ram 34, the shaft together with the lever 116 and rod 103 will be moved downwardly with the ram and the shaft will slide through the bearing 113. Arranged below the bearing 113 is a switch control lever 121. This lever is formed with an upwardly extending bearing portion 122 which extends through the bearing 113 and which is held in place therein by means of a retaining ring 123. This lever is, of course, provided with an aperture 124 which fits and has sliding engagement with the shaft 112, whereby movements of the rod operating lever 116 will be transmitted to the switch control lever at any point in the travel of the ram. The lever 121 is provided with an operating screw 125, which engages the operating button 126 of the control switch 110. This switch, as hereinafter described, is a normally closed switch and serves when operated to interrupt the circuit, to be hereinafter described. A safety cam 130 is carried on the front face of the mounting plate 111 and is provided with an inclined face 131. The shaft 112 extends upwardly a distance above the bearing plate 114 substantially equal to or slightly in excess of the amount of travel of the ram 34 and it is provided at its upper end with a switch operating lever 132. This lever is clamped to the upper end of the shaft and is provided with an actuating screw 133. This lever and screw are so positioned and adjusted that should the ram be moved downwardly when there is no workpiece in position beneath it, the ram will be prevented from becoming forced out of the sleeve because of the continued operation of the ram screw for the reason that the screw 133 will contact with the surface 131 of the cam 130 and cause the oscillation of the shaft 112 and consequent operation of the switch 110.

Surrounding the control means carried by the mounting plate is a casing 134 comprising an upper section 135 and a lower section 136. The upper section is carried by the mounting plate 111 and is secured thereto preferably by attaching blocks 140. The lower section of the casing is secured to the base plate 81. The lower section 136 preferably overlaps the upper section 35 in telescopic manner, so that when the base plate is moved downwardly the casing parts will be moved relatively to each other. A cover plate 141 is preferably secured to the bottom of the base plate and serves to close the bottom of the casing.

A limit switch 142 is carried by the mounting plate 111 and serves to limit the upward travel of the ram. The button of this switch is extended downwardly and is engaged by a limit switch screw 144 when the uppermost travel of the ram is reached. This screw is carried by the base plate and is provided with a compression spring 145, whereby any overtravel of the ram in coming to rest will be absorbed.

The rod operating lever 116 is provided at its outer end with a spring screw 146 (see Fig. 7) to one end of which is secured a tension spring 150, the other end of the spring is carried by a stud 151 extending from the surface of the mounting plate 111. This spring is adjusted so as to cause the adjusting screw 120 carried by this lever to firmly bear against the end 106 of the push rod, thereby taking up all lost motion between the pin 94 and the shaft.

Referring to the modified form shown in Fig. 10, the push rod 152 is connected to the anvil 92 by means of an actuating cam 153. This cam is preferably made of flat material and it is mounted within an opening 154 formed in the index flange 155. The cam is formed with a forwardly extending leg 156, the upper surface of which bears against an overhanging shoulder 160 formed in the aperture 154. Opposite the leg 156, the cam is formed with a leg 161 which normally bears on the top surface of a ledge 162 also formed in the aperture 154. A helical spring 163 serves to keep the leg 161 engaged with the ledge 162, and at the same time serves to keep the downwardly extending leg 164 substantially in contact with the upper surface of the head 91 of the anvil. The cam is also provided at its upper end with a leg 165 which extends laterally in the same direction as the leg 156. This leg 165 normally bears against the inner end of the push rod 152. In this form the anvil is mounted for floating movement as in the form above described, and when it is moved upwardly the leg 164 contacting the head of the anvil will push the cam upwardly against the tension of the spring 163. Since the leg 156 is in contact with the shoulder 160, the cam will be caused to oscillate about the shoulder as a fulcrum point. This will serve to force the leg 165 to the left as viewed in Fig. 10 and serve to push the rod 152 outwardly to cause its upper end 166 to oscillate the shaft 112 through the medium of the rod operating lever 116, as described above in connection with the other form of the invention.

Figure 11:
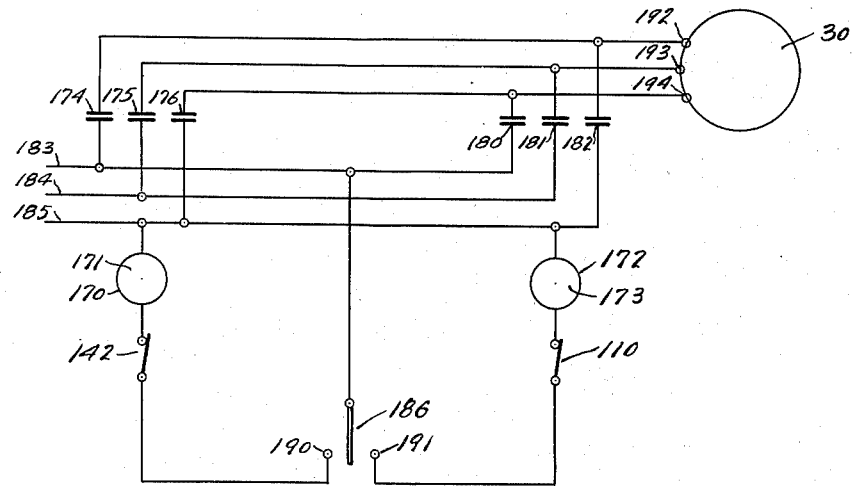
Fig. 11 is a diagrammatic view of one form of electric control circuit used in connection with my invention.

Referring now to Fig. 11 where I show the method of connecting my invention in an illustrative electric circuit, 170 and 172 represent magnetically held contactors which are provided with solenoid operating or holding coils 171 and 173, respectively. The contactor 170 is provided with normally open contacts 174, 175 and 176, and the contactor 172 is likewise provided with normally open contacts 180, 181 and 182. The power lines are represented by the numerals 183, 184 and 185. One side of each of the holding coils 171 and 173 are connected to the power line 185, current returning to the power line 183 either through switch 142 or 110, respectively, and through a manual double throw switch 186. The switch 186 has contacts 190 and 191 for operating the motor 30 to cause the ram to be operated upwardly or downwardly, respectively. The line 183 is connected through normally open contacts 174 and 182 to the terminal 192 of the motor; normally open contacts 175 and 181 are connected to the terminal 193 of the motor; and normally open contacts 176 and 180 are connected to the terminal 194 of the motor.

From the foregoing it will be obvious that when it is desired to move the ram downwardly, the hand switch 186 or equivalent means is moved to contact terminal 191. Current will now flow from line 186 over the closed contacts of switch 186, through switch 110 and holding coil 173 of contactor 172, thereby closing the normally open contacts 180, 181 and 182 and allowing current to flow from leads 183, 184 and 185, respectively, to the terminals 192, 193 and 194, respectively, of the motor. The motor will thus be actuated to rotate the ram screw 42 to lower the ram 34 until the bucking tool is brought to bear upon the surface of the workpiece, whereupon it is moved upwardly within the anvil ways 86 causing vertical movement of the actuating pin 94 or rocking movement of the actuating cam 153. Such movement, as hereinbefore described, causes the lateral radial movement of either of the push rods 103 or 152 and the subsequent oscillation of the control shaft 112, thereby opening of the normally closed control switch 110, and interrupting the flow of current through the holding coil 173, thereby allowing the respective terminals to fall open, which will cause the motor to stop. When the hand switch 186 or other equivalent means is operated to contact 190, the contacts 174, 175 and 176 of the contactor 170 will be closed through the normally closed switch 142 and the holding coil 171 of the contactor. Since the contactors 170 and 171 are reversely connected to the power lines, the motor 30 will be operated in a direction to elevate the ram. If the upward movement of the ram is not interrupted before it has reached the upper end of its stroke, the limit screw 144 will contact the limit switch 142, thereby interrupting the current to the motor through the contactor contacts 174, 175 and 176 which will fall open when the holding coil 173 is de-energized.

Having thus described my invention, what I claim is:

1. Means for controlling the movement of a tool, comprising a reciprocating ram, power means for reciprocating said ram, a tool carried by said ram and having relative axial movement with respect thereto, an oscillatably mounted control shaft carried by said ram, said shaft having its axis in spaced parallel relation with the axis of said ram and movable axially therewith, slidably mounted actuating means carried by said ram for operatively connecting said tool with said shaft, and lever means carried by said shaft and operated by said actuating means for controlling said power means.

2. Means for controlling the movement of a tool, comprising a reciprocating ram, power means for reciprocating said ram, a tool carried by said ram and having relative axial movement with respect thereto, a control shaft carried by said ram and having its axis in parallel spaced relation with the axis of said ram, said shaft being movable axially with said ram, a push rod movable laterally with respect to the axis of said ram, said rod being carried by said ram and having operative connection with said shaft, an actuating member carried by said ram and coactively engaged with said tool and said rod to transmit movement of the former to the latter, and lever means carried by said shaft for controlling said power means.

3. Means for controlling the movement of a tool, comprising a reciprocating ram, a guide sleeve for said ram, power means for reciprocating said ram within said sleeve, a tool carried by said ram and having relative axial movement with respect thereto, a control shaft slidably supported by said sleeve and movable axially with said ram, a push rod actuated by said tool and operatively connected to said shaft, and lever means carried by said shaft for controlling said power means.

4. Means for controlling the movement of a tool, comprising a reciprocating ram, a guide sleeve for slidably supporting said ram, motor means for reciprocating said ram, a tool carried by said ram and having relative axial movement with respect thereto, an oscillating control shaft slidably supported by said sleeve and movable axially with said ram, a push rod carried by said ram and movable laterally with respect to the axis thereof, said rod having operative connection with said shaft, an actuating member carried by said ram and coactively engaged with said rod to cause it to reciprocate, switch means carried by said sleeve for controlling said motor, and lever means carried by said shaft for operating said switch means.

5. Means for controlling the movement of a tool, comprising a reciprocating ram, a guide sleeve for slidably supporting said ram, motor means for reciprocating said ram, a tool carried by said ram and having relative axial movement with respect thereto, a control shaft slidably supported by said sleeve and movable axially with said ram, switch means carried by said sleeve for controlling said motor, actuating means operatively connecting said tool with said shaft, lever means carried by said shaft for operating said switch, cam means carried by said sleeve, auxiliary lever means carried by said shaft and engageable with said cam when the ram reaches the end of its stroke to interrupt the motor means.

6. Means for controlling the movement of a tool, comprising a reciprocating ram, power means for reciprocating said ram, a tool carried by said ram and having relative axial movement with respect thereto, a control shaft movable axially with said ram, a push rod carried by said ram and movable laterally with respect to the axis thereof, said rod having operative connection with said shaft, and formed with an inclined surface at its inner end, an actuating pin carried by said ram and having a tapered point engageable with the inclined surface of said rod, said pin being engageable with said tool for movement therewith, and lever means carried by said shaft for controlling the power means.

7. Means for controlling the movement of a tool, comprising a reciprocating ram, power means for reciprocating said ram, a tool carried by said ram and having relative axial movement with respect thereto, a control shaft movable axially with said ram, a push rod carried by said ram and having operative connection with said shaft, said rod being movable laterally with respect to the axis of said ram, an actuating cam carried by said ram and functioning as a bell-crank to transmit the relative movement of said tool to said rod, and lever means carried by said shaft for controlling the power means.

WILBUR JOHNDREW.

REFERENCES CITED

The following references are of record in the file of this patent:

UNITED STATES PATENTS

| Number | Name | Date |
|---|---|---|
| 364,307 | See | June 7, 1887 |
| 382,142 | Cumming | May 1, 1888 |
| 719,522 | Slater | Feb. 3, 1903 |
| 1,463,146 | Bernard | July 24, 1923 |
| 1,506,454 | Shaw | Aug. 26, 1924 |
| 1,923,853 | Van Duyn | Aug. 22, 1933 |
| 1,930,780 | Soules | Oct. 17, 1933 |
| 2,003,557 | Sassen | June 4, 1935 |
| 2,254,256 | Zeruneith | Sept. 2, 1941 |
| 2,289,108 | Eaton | July 7, 1942 |
| 2,311,203 | Bickel | Feb. 16, 1943 |
| 2,328,919 | Merriman | Sept. 7, 1943 |
| 2,338,157 | Allen | Jan. 4, 1944 |
| 2,353,471 | Johndrew | July 11, 1944 |
| 2,354,914 | Goldstein | Aug. 1, 1944 |
| 2,366,960 | England | Jan. 9, 1945 |
| 2,378,212 | Giern | June 12, 1945 |
| 2,379,305 | Kaninky | June 26, 1945 |